US009678294B2

(12) United States Patent
Yin et al.

(10) Patent No.: US 9,678,294 B2
(45) Date of Patent: Jun. 13, 2017

(54) OPTICAL FIBER CONNECTION APPARATUS

(71) Applicants:Amphenol Fiber Optic Technology (Shenzhen), Shenzhen, Guangdong Province (CN); Gloriole Electroptic Technology Corp., Kaohsiung (TW); SHEN ZHEN WONDERWIN TECHNOLOGY CO., LTD., Shen Zhen, Guang Dong Province (CN)

(72) Inventors: Rui Yin, Shenzhen (CN); Song-Sheng Li, Shenzhen (CN); Bo-Lin Jiang, Shenzhen (CN); Ling-Hua Zhu, Shenzhen (CN); Jim Lin, Kaohsiung (TW); Chia-Hua Wu, Kaohsiung (TW)

(73) Assignees: AMPHENOL FIBER OPTIC TECHNOLOGY, Shenzhen, Guangdong Province (CN); GLORIOLE ELECTROPTIC TECHNOLOGY CORP., Kaohsiung (TW); SHEN ZHEN WONDERWIN TECHNOLOGY CO., LTD., Shen Zhen, Guang Dong Province (CN)

( * ) Notice: Subject to any disclaimer, the term of this patent is extended or adjusted under 35 U.S.C. 154(b) by 0 days.

(21) Appl. No.: 14/955,704

(22) Filed: Dec. 1, 2015

(65) Prior Publication Data

US 2016/0370549 A1 Dec. 22, 2016

(30) Foreign Application Priority Data

Jun. 17, 2015 (TW) .............................. 104209735 U

(51) Int. Cl.
*G02B 6/38* (2006.01)
*G02B 6/44* (2006.01)

(52) U.S. Cl.
CPC ......... *G02B 6/4452* (2013.01); *G02B 6/3825* (2013.01); *G02B 6/3885* (2013.01); *G02B 6/3897* (2013.01); *G02B 6/4447* (2013.01); *G02B 6/3893* (2013.01)

(58) Field of Classification Search
CPC ....................................................... G02B 6/36
USPC ......................................... 385/134–139, 147
See application file for complete search history.

(56) References Cited

U.S. PATENT DOCUMENTS

| 8,876,403 | B2* | 11/2014 | Katoh | G02B 6/3831 |
| | | | | 385/55 |
| 9,239,428 | B2* | 1/2016 | Christopher | G02B 6/25 |
| 9,291,781 | B1* | 3/2016 | Zhou | G02B 6/403 |
| 9,323,007 | B1* | 4/2016 | Yang | G02B 6/3825 |
| 2006/0165366 | A1* | 7/2006 | Feustel | G02B 6/2804 |
| | | | | 385/135 |

(Continued)

*Primary Examiner* — Akm Enayet Ullah
(74) *Attorney, Agent, or Firm* — Muncy, Geissler, Olds & Lowe, P.C.

(57) ABSTRACT

An optical fiber distribution apparatus includes a panel extending along a first direction and formed with a first mounting hole and at least two second mounting holes spaced apart from the first mounting hole along the first direction. A plurality of rows of optical fiber connector adapters are arranged in a stack in a direction transverse to the first direction and are inserted into the first mounting hole. At least two multi-fiber push on (MPO) connector adapters are respectively inserted into the at least two second mounting holes.

6 Claims, 5 Drawing Sheets

(56) References Cited

U.S. PATENT DOCUMENTS

| | | | | |
|---|---|---|---|---|
| 2011/0249942 A1* | 10/2011 | Livingston | ........... | G02B 6/3825 |
| | | | | 385/59 |
| 2014/0205244 A1* | 7/2014 | Bradley | ............... | G02B 6/3869 |
| | | | | 385/78 |
| 2014/0341509 A1* | 11/2014 | Coleman | .............. | G02B 6/4472 |
| | | | | 385/54 |
| 2015/0355414 A1* | 12/2015 | Chen | .................... | G02B 6/3807 |
| | | | | 385/76 |

* cited by examiner

OPTICAL FIBER CONNECTION APPARATUS

CROSS-REFERENCE TO RELATED APPLICATION

This application claims priority to Taiwanese Application No. 104209735, filed on Jun. 17, 2015.

FIELD

The disclosure relates to an optical apparatus, and more particularly to an optical fiber distribution apparatus.

BACKGROUND

Referring to FIGS. 1 and 2, an existing MPO-LC optical fiber distribution apparatus 1 includes a housing 11 formed with two spaced-apart first insertion holes 111 at a rear end thereof and having a front panel 12 formed with six spaced-apart second insertion holes 121, two multi-fiber push on (MPO) connector adapters 13 respectively inserted into and protruding from the first insertion holes 111, six LC adapters 14 respectively inserted into and protruding from the second insertion holes 121, and two fiber optic jumpers 15 each having a plurality of first ends optically and respectively connected to the LC adapters 14 and a second end opposite to the first ends and optically connected to a respective one of the MPO connector adapters 13.

Although the existing MPO-LC optical fiber distribution apparatus 1 can be conveniently used for managing optical signals, because the second insertion holes 121 occupy most part of the front panel 12 for insertion of the LC adapters 14, the first insertion holes 111 can only be formed in the rear end of the housing 11 for insertion of the MPO connector adapters 13.

Because the LC adapters 14 and the MPO connector adapters 13 are located on the front and rear ends of the housing 11, insertion and removal of the optical fiber connectors (not shown) into and from the respective adapters 13, 14 are troublesome. Moreover, forming of the first insertion holes 111 at the rear end of the housing 11 and the second insertion holes 121 at the front panel 12 may increase the manufacturing cost.

SUMMARY

Therefore, an object of the disclosure is to provide an optical fiber distribution apparatus that can alleviate at least one of the drawbacks of the prior art.

According to the disclosure, an optical fiber distribution apparatus includes an optical fiber distribution unit. The optical fiber distribution unit includes a panel, a plurality of rows of optical fiber connector adapters and at least two multi-fiber push on (MPO) connector adapters. The panel extends along a first direction and is formed with a first mounting hole and at least two second mounting holes spaced apart from the first mounting hole along the first direction. The rows of the optical fiber connector adapters are arranged in a stack in a direction transverse to the first direction and are inserted into the first mounting hole. The at least two multi-fiber push on (MPO) connector adapters are respectively inserted into the at least two second mounting holes.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
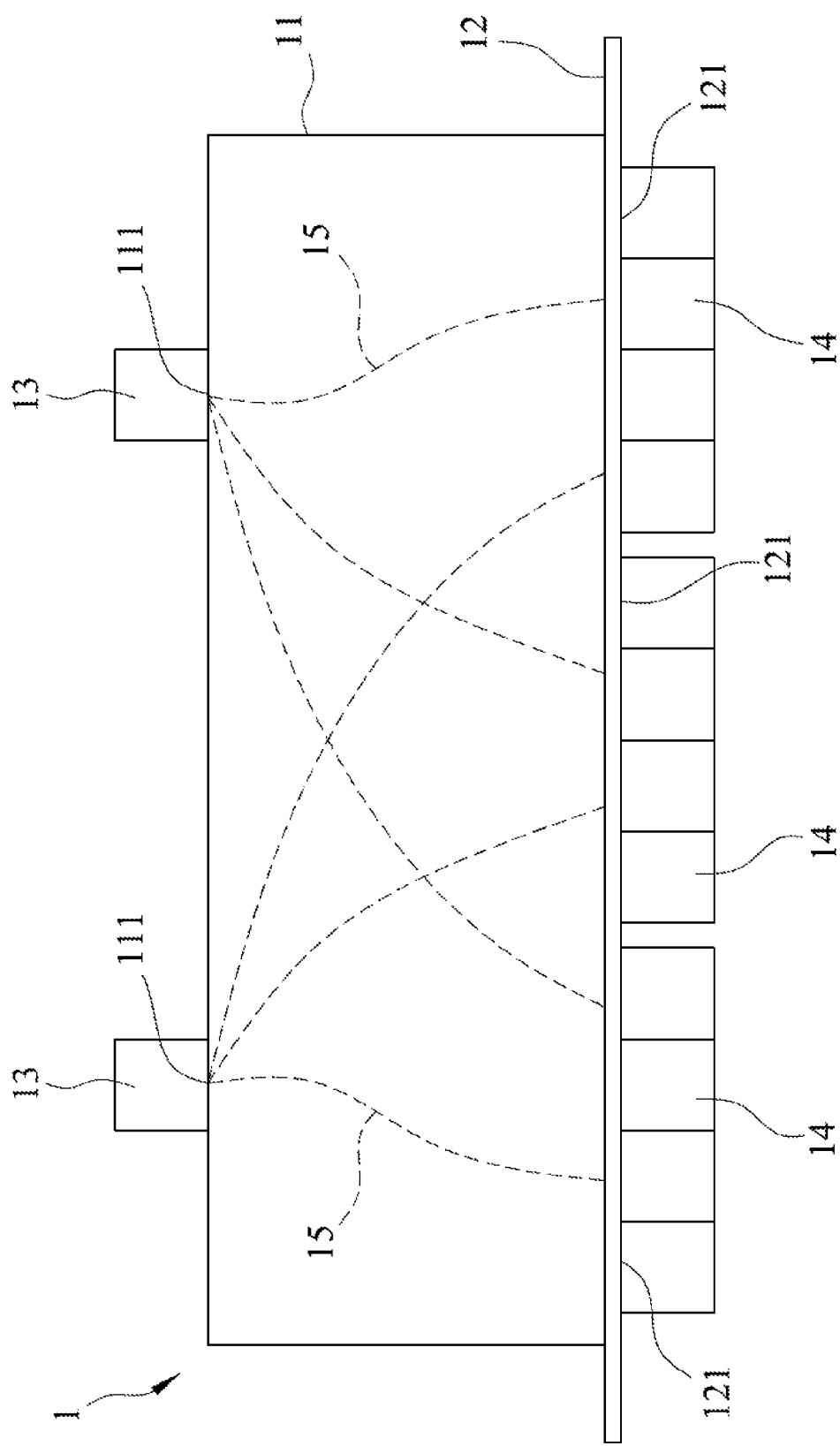
FIG. 1 is a view of an existing MPO-LC optical fiber distribution apparatus.
Figure 2:
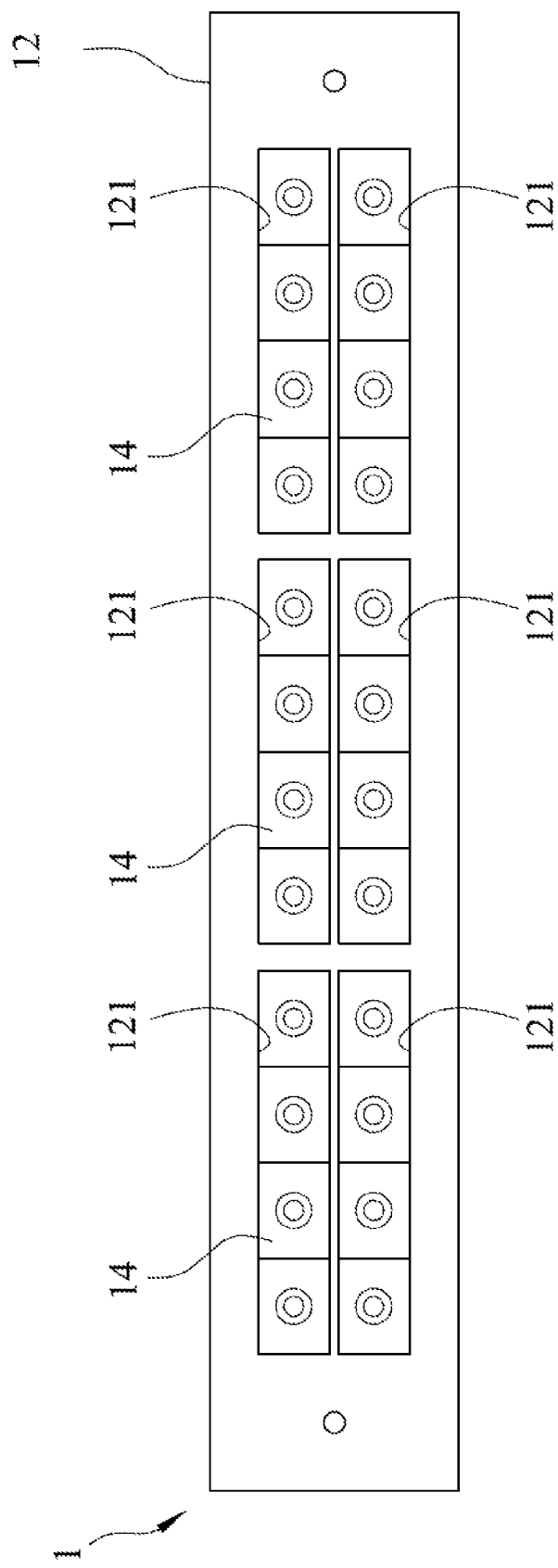
FIG. 2 is a front view of the existing MPO-LC optical fiber distribution apparatus.

Before the present disclosure is described in greater detail, it should be noted that like elements are denoted by the same reference numerals throughout the disclosure.

Figure 3:
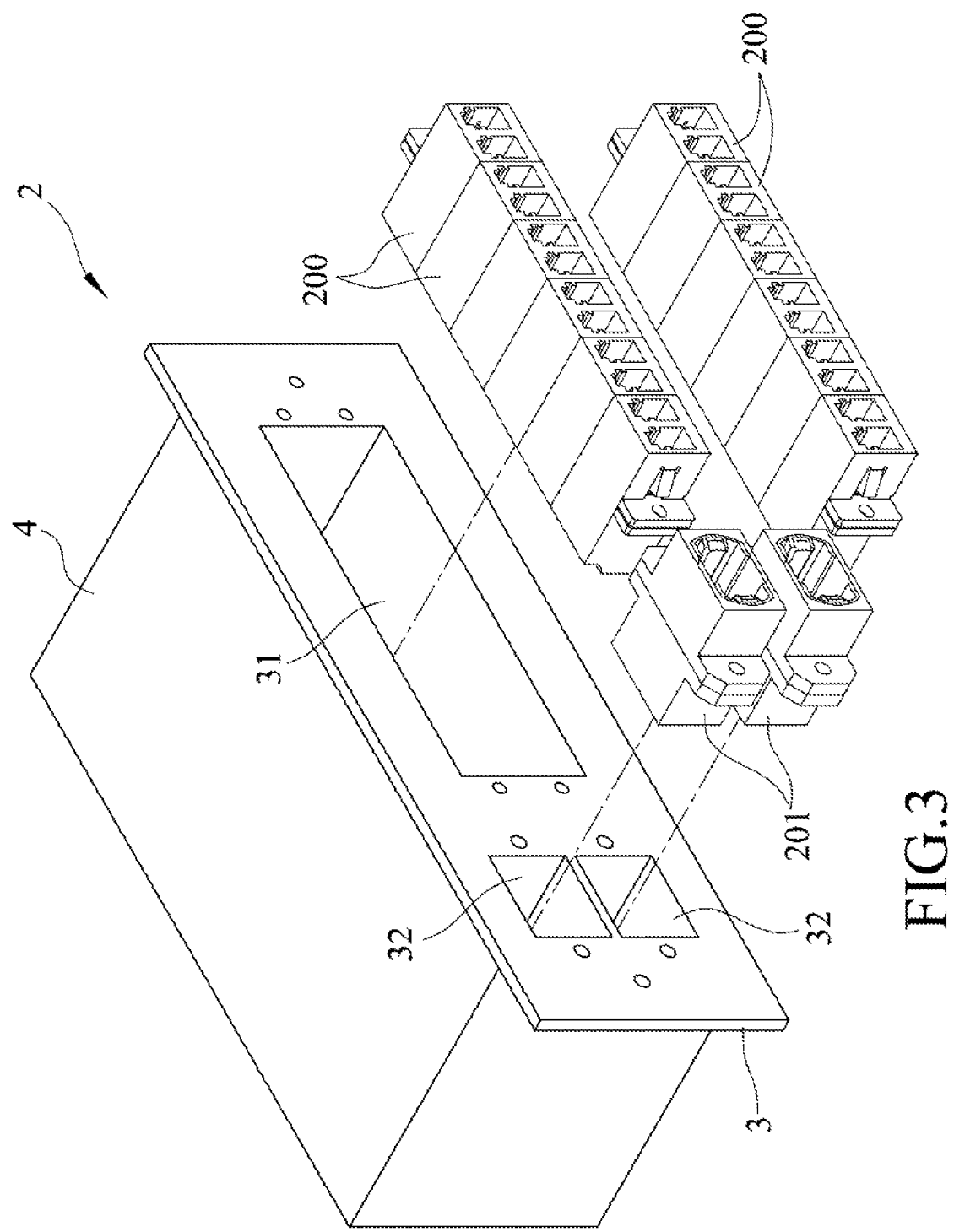
FIG. 3 is an exploded view of an optical fiber distribution apparatus of a first embodiment according to the disclosure.
Figure 4:
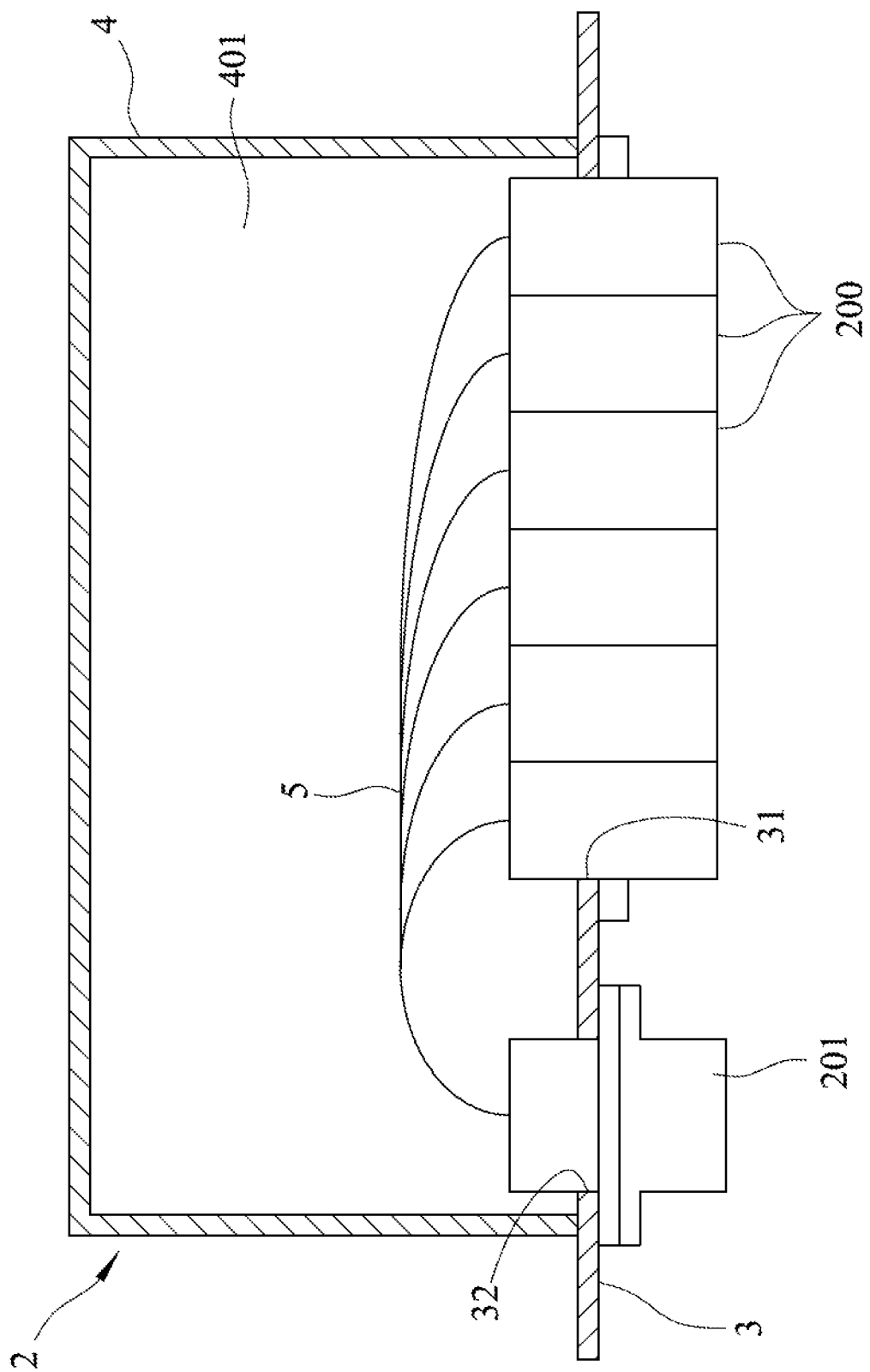
FIG. 4 is a sectional view of the first embodiment.

Referring to FIGS. 3 and 4, an optical fiber distribution apparatus of a first embodiment according to the disclosure includes an optical fiber distribution unit 2. The optical fiber distribution unit 2 includes a panel, a plurality of rows of optical fiber connector adapters 200, two multi-fiber push on (MPO) connector adapters 201 and two fiber optic jumpers 5 (only one is shown in FIG. 4).

The panel extends along a first direction, which is a left-right direction, and includes a housing 4 and a front panel 3 connected to a front end of the housing 4. The front panel 3 is formed with a first mounting hole 31, and two second mounting holes 32 spaced apart from the first mounting hole 31 along the first direction and spaced apart from each other in a direction transverse to the first direction. The housing 4 defines a receiving space 401 communicating with the first mounting hole 31 and the two second mounting holes 32.

In this embodiment, two rows of the optical fiber connector adapters 200 are coupled to each other, and are arranged in a stack in the direction transverse to the first direction. Further, the optical fiber connector adapters 200 are inserted into the first mounting hole 31 such that the first optical fiber connector adapters 200 are partially received in the receiving space 401 and partially protrude from the front panel 3. Each of the optical fiber connector adapters 200 is an LC adapter. In actual practice, the number of the rows of the optical fiber connector adapters 200 may be increased according to the requirement, and is not limited to what is disclosed in this embodiment. Moreover, each of the optical fiber connector adapters 200 may be an SC adapter or an MU adapter.

The two multi-fiber push on (MPO) connector adapters 201 are respectively inserted into the two second mounting holes 32 such that they are partially received in the receiving space 401 and partially protrude from the front panel 3.

The fiber optic jumpers 5 are disposed in the receiving space 401. Each fiber optic jumper 5 has a plurality of first ends optically and respectively connected to the optical fiber connector adapters 200 in one of the rows thereof, and a second end opposite to the first ends and optically connected to a respective one of the MPO connector adapters 201.

By virtue of the optical fiber connector adapters 200 being stacked to each other, the front panel 3 can be formed with only one first mounting hole 31 for insertion of the stacked rows of the optical fiber connector adapters 200, thereby effectively reducing space wastage. Further, because the optical fiber connector adapters 200 and the MPO connector adapters 201 partially protrude from the front panel 3, insertion and removal operations of optical fiber connectors (not shown) into and from the respective adapters 200, 201 can be facilitated.

Furthermore, because the first mounting hole 31 and the second mounting holes 32 are formed in the front panel 3, only one punching die is required to form the first mounting hole 31 and the second mounting holes 32 in a single process, thereby effectively reducing the manufacturing cost.

Figure 5:
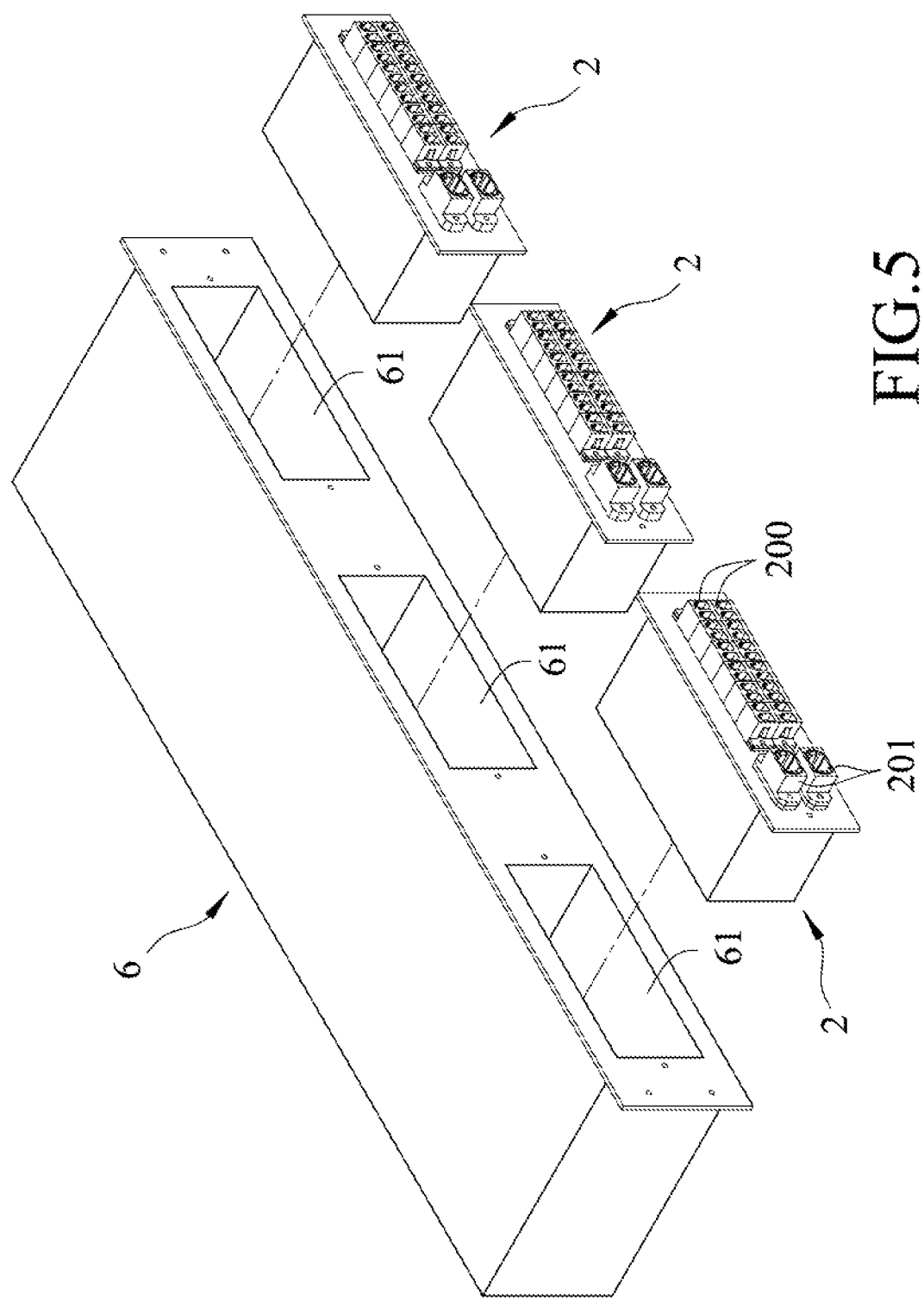
FIG. 5 is an exploded view of an optical fiber distribution apparatus of a second embodiment according to the disclosure.

FIG. 5 illustrates an optical fiber distribution apparatus of a second embodiment according to the disclosure which is generally similar to the first embodiment. The difference between the first and second embodiments resides in that the optical fiber distribution apparatus of the second embodiment further includes an external box 6 for accommodating a plurality of the optical fiber distribution units 2. In this embodiment, the external box 6 has three insertion holes 61, and three optical fiber distribution units 2 are respectively inserted into the insertion holes 61 in such a manner that the optical fiber connector adapters 200 and the MPO connector adapters 201 are exposed from the external box 6. Aside from the second embodiment achieving the advantages similar to those of the first embodiment, with the insertion holes 61 of the external box 6 respectively receiving the three optical fiber distribution units 2, the overall configuration of the optical fiber distribution device of the disclosure can be more compact.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An optical fiber connection apparatus comprising:
    an optical fiber distribution unit including
        a housing;
        a front panel connected to a front end of said housing, said front panel being formed with a first mounting hole and at least two second mounting holes spaced apart from said first mounting hole along a first direction;
        said housing defining a receiving space communicating with said first mounting hole and said at least two second mounting holes;
        a plurality of rows of optical fiber connector adapters arranged in a stack in a direction transverse to the first direction and inserted into said first mounting hole;
        at least two multi-fiber push on (MPO) connector adapters respectively inserted into said at least two second mounting holes; and
        said optical fiber connector adapters and said at least two MPO connector adapters being partially received in said receiving space and partially protruding from said front panel.

2. The optical fiber connection apparatus as claimed in claim 1, wherein said optical fiber distribution unit further includes at least two fiber optic jumpers disposed in said receiving space, each of said at least two fiber optic jumpers having a plurality of first ends optically and respectively connected to said optical fiber connector adapters in one of said rows of said first optical fiber connector adapters, and a second end opposite to said first ends and optically connected to a respective one of said at least two MPO connector adapters.

3. The optical fiber connection apparatus as claimed in claim 1, further comprising an external box for accommodating a plurality of said optical fiber distribution units, said optical fiber connector adapters and said at least two MPO connector adapters of said optical fiber distribution units being exposed from said external box.

4. The optical fiber connection apparatus as claimed in claim 1, wherein each of said optical fiber connector adapters is an LC adapter.

5. The optical fiber connection apparatus as claimed in claim 1, wherein each of said optical fiber connector adapters is an SC adapter.

6. The optical fiber connection apparatus as claimed in claim 1, wherein each of said optical fiber connector adapters is an MU adapter.

\* \* \* \* \*